United States Patent Office 3,480,702
Patented Nov. 25, 1969

3,480,702
METHOD OF PRODUCING A NUCLEAR
REACTOR FUEL ELEMENT
Lionel Houston Ford, St. Anne's-on-the-Sea, England, assignor to United Kingdom Atomic Energy Authority, London, England
No Drawing. Filed June 5, 1967, Ser. No. 643,399
Claims priority, application Great Britain, May 26, 1967, 24,663/67
Int. Cl. G21c 3/06, 3/20, 21/00
U.S. Cl. 264—.5
2 Claims

ABSTRACT OF THE DISCLOSURE

A nuclear reactor fuel element comprises particles of ceramic fissile material, each having a coating of non-fissile ceramic material. The particles are contained in an outer ceramic container and the particles are bonded together in a region about each of their points of contact in the container by an individual bridge of a metal such that the interspaces between the particles are free of the metallic bonding material. The method of making the fuel element comprises the steps of overcoating the particles with a solid layer of metal, and then filling said ceramic container with the metal coated particles. The ceramic container and contained particles are heated to melt the metal coating on the particles so that the molten metal moves by capillary action to form individual bridges of the metal bonding said particles together in the region about each of their points of contact in the container.

BACKGROUND OF THE INVENTION

This invention relates to nuclear reactor fuel elements and is particularly concerned with the production of nuclear reactor fuel elements which are suitable for operation at high temperatures in contact with fluid coolant and which are capable of retaining solid and more particularly gaseous fission products which are produced as a result of irradiation of the fuel elements in a nuclear reactor, whereby contamination of the coolant by fission products is avoided.

On form of fuel element satisfying the above conditions comprises a dispersion of coated particles of fissile material in a solid matrix of non-fissile material. Such a fuel element may be of all ceramic form comprising, for example, particles of uranium carbide having an outer coating of pyrolytically deposited carbon or silicon carbide, the particles being dispersed in a solid matrix of silicon carbide having an outer coating of fuel free silicon carbide.

There is a thermal stress limitation on the temperature at which such a fuel element can be operated. Although the bulk thermal conductivity of such a fuel element is relatively high the temperature arising at the centre of this type of fuel element is always higher than the temperature at the surface. Hence on rise to operating temperature the centre region of the fuel element expands by a greater amount than the surface region and thermal stresses are set up in the surface region which, if too great, can cause cracking of the outer layer of fuel free material.

Another form of fuel element comprises a closed container of ceramic material containing a loose mass of coated particles of nuclear fuel material.

The major advantages of this type of fuel element are higher fuel densities and no surface thermal stress limitations. The higher fuel densities result from the greater packing fraction of coated particles as compared with the type of fuel element having a solid matrix of non-fissile material between the coated particles (60 volume percent as compared with 38 volume percent), and the fact that thinner coats are possible on the particles as the coats do not have to be resistant to mechanical damage during manufacture of the fuel element. The thermal stress limitation no longer applies since the fuel core and the outer ceramic container are not homogeneous and thermal expansion of the fuel core relative to the container can be accommodated by deformation in the fuel core itself.

A disadvantage of this type of fuel element lies in the fact that should the outer container be broken, loose fuel particles can escape into the reactor coolant stream and may escape to inaccessible positions in the reactor. Also the low overall thermal conductivity of a loosely aggregated mass of fuel particles results in the particles at the centre of the mass operating at what may be prohibitively high temperatures.

SUMMARY OF THE INVENTION

According to the present invention a nuclear reactor fuel element comprises particles of ceramic fissile materal, each having a coating of non-fissile ceramic material, the particles being contained in an outer ceramic container and the particles being bonded together in a region about each of their points of contact in the container by an individual bridge of bonding material of high thermal conductivity the interspace between the particles being free of bonding material.

In a method for producing a nuclear fuel element in accordance with the invention, particles of ceramic fissile material having a coating of non fissile ceramic material are provided with a thin solid overcoating of the metal which is to provide a bond, the particles are then poured into the container and the particles heated in situ to melt the overcoating of metal so that the metal flows by capillary action to form a bridge of bonding metal at the points of contact of the particles.

It is an object of the method to bond the particles together by bridging only at their points of contact and not to completely fill the interspaces between the particles. This end is achieved by provision of suitable thickness of metal overcoating on the particles.

The metal overcoating is preferably effected in the vapour phase by thermal decomposition of the halide of suitable metals.

DESCRIPTION OF THE PREFERRED EMBODIMENT

In one method for production of a fuel element in accordance with the invention uranium carbide particles having an outer coating of pyrolytically deposited carbon may be overcoated with silicon metal in fluidised bed such as is disclosed in British Patent No. 1,031,154. A charge of particles 650 microns overall diameter are fluidised in the bed which is heated to a temperature in the range 800–1300° C., for example 1100° C. Fluidisation is by means of hydrogen and for a bed of 1½ inches diameter the fluidisation flow rate is 33.75 litres per minute. A by-pass stream from the main hydrogen gas flow (for example 1.75 litres per minute) is bubbled through a vessel containing silicon tetrachloride the by-pass stream then being passed to rejoin the main fluidising gas stream. A vapourisation rate of for example 10 grams per hour of silicon tetrachloride is obtained. Silicon metal is deposited on the coated particles in the fluidised bed by thermal decomposition of the silicon tetrachloride a silicon deposition efficiency of 53% being typically obtained. Deposition is continued until a required coating thickness is obtained. In the case of 65 micron diameter particles a coating of 10 microns in thickness is sufficient.

The particles are then poured into a silicon carbide tube one end of which is closed by an integrally formed silicon carbide end cap. The tube containing the particles is then heated, for example at 1750° C. for 30 minutes. During this heating period the silicon overcoating on the particles melts and moves by capillary action to form a bridge of silicon metal bonding the particles at their points of contact.

The invention is not limited to the use of silicon metal as the bonding material nor is the invention only applicable to the bonding of carbon coated uranium carbide particles. Other bonding metals such as molybdenum, zirconium, niobium etc. can be employed and the invention is applicable to the bonding of particles of other fissile materials such as uranium dioxide uranium nitride having coatings of for example silicon carbide beryllia, alumina etc.

I claim:

1. A method of producing a nuclear reactor fuel element comprising particles of ceramic fissile material, each having a coating of non-fissile ceramic material, the particles being contained in an outer ceramic container and the particles being bonded together in a region about each of their points of contact in the container by an individual bridge of metal, the interspaces between the particles being free of bonding material, said method comprising the steps of over-coating the particles with a solid layer of metal, filling said ceramic container with the metal-coated particles, heating the ceramic container and contained particles to melt the metal coating on the particles so that the molten metal moves by capillary action to form individual bridges of the metal bonding said particles together in the region about each of their points of contact in the container.

2. A method of producing a nuclear reactor fuel element as claimed in claim 1 wherein the particles are of uranium carbide each having a coating of pyrolytically deposited carbon, the carbon coated uranium carbide particles being overcoated with a solid layer of silicon, the ceramic container then being filled with the silicon metal coated particles, the ceramic container and contained particles then being heated to melt the coating of silicon on the particles so that the molten silicon moves by capillary action to form individual bridges of silicon bonding the particles together in the region about each of their points of contact in the container.

References Cited

UNITED STATES PATENTS

| | | | |
|---|---|---|---|
| 3,088,892 | 5/1963 | Cain et al. | 264—.5 X |
| 3,122,595 | 2/1964 | Oxley | 264—.5 |
| 3,166,614 | 1/1965 | Taylor | 264—.5 |
| 3,293,332 | 12/1966 | Ingleby | 264—.5 |
| 3,318,695 | 5/1967 | Goslee et al. | 264—.5 X |
| 3,366,576 | 1/1968 | Meyer et al. | 264—.5 X |

CARL D. QUARFORTH, Primary Examiner

MELVIN J. SCOLNICK, Assistant Examiner

U.S. Cl. X.R.

117—100; 176—67, 91